(12) United States Patent
Ohno

(10) Patent No.: US 11,951,856 B2
(45) Date of Patent: Apr. 9, 2024

(54) ROOF STRUCTURE

(71) Applicant: SEKISUI HOUSE, LTD., Osaka (JP)

(72) Inventor: Noriyuki Ohno, Osaka (JP)

(73) Assignee: SEKISUI HOUSE, LTD., Osaka (JP)

( * ) Notice: Subject to any disclaimer, the term of this patent is extended or adjusted under 35 U.S.C. 154(b) by 360 days.

(21) Appl. No.: 17/431,749

(22) PCT Filed: Aug. 19, 2020

(86) PCT No.: PCT/JP2020/031329
§ 371 (c)(1),
(2) Date: Aug. 18, 2021

(87) PCT Pub. No.: WO2021/117296
PCT Pub. Date: Jun. 17, 2021

(65) Prior Publication Data
US 2022/0111744 A1    Apr. 14, 2022

(30) Foreign Application Priority Data
Dec. 9, 2019 (JP) .................................. 2019-222395

(51) Int. Cl.
*B60L 53/30* (2019.01)
*B60L 53/51* (2019.01)
(Continued)

(52) U.S. Cl.
CPC ............... *B60L 53/30* (2019.02); *B60L 53/51* (2019.02); *B64F 1/362* (2013.01); *E01F 3/00* (2013.01);
(Continued)

(58) Field of Classification Search
None
See application file for complete search history.

(56) References Cited

U.S. PATENT DOCUMENTS 10,303,167 B2    5/2019  Chen et al.
10,351,261 B1 *  7/2019  Bryant ..................... B64F 1/32
(Continued)

FOREIGN PATENT DOCUMENTS

JP    2017-516024 A    6/2018
JP    2018-112029 A    7/2018
(Continued)

OTHER PUBLICATIONS

International Search Report issued in application No. PCT/JP2020/031329.
(Continued)

*Primary Examiner* — Joshua K Ihezie
(74) *Attorney, Agent, or Firm* — McClure, Qualey & Rodack, LLP

(57) ABSTRACT

A roof structure that can provide a drone port where a drone can stably take off and land on a sloping roof includes a sloping roof covering the upper part of a building, a drone accommodation portion that has a size capable of accommodating a drone and is provided to cut out a part of the sloping roof so that a bottom surface is substantially horizontal, a drone port that is provided on the bottom surface of the drone accommodation portion where the drone can take off and land, a cover that covers an opening formed on the sloping roof for the drone accommodation portion, and a doorway that is provided on the drone accommodation portion and allows the drone to enter and exit, in which the cover is configured to be openable and closable, and the doorway is opened and closed by opening and closing of the cover.

2 Claims, 11 Drawing Sheets

(51) Int. Cl.
    *B64F 1/36*     (2017.01)
    *E01F 3/00*     (2006.01)
    *E04B 7/16*     (2006.01)
    *E04H 6/44*     (2006.01)
    *E05F 15/70*     (2015.01)
    *H02J 7/35*     (2006.01)
    *H02J 50/12*     (2016.01)
    *H02S 20/23*     (2014.01)

(52) U.S. Cl.
    CPC ............... *E04B 7/166* (2013.01); *E04H 6/44* (2013.01); *E05F 15/70* (2015.01); *H02J 7/35* (2013.01); *H02J 50/12* (2016.02); *H02S 20/23* (2014.12); *E05Y 2400/40* (2013.01); *E05Y 2900/13* (2013.01)

(56) References Cited

U.S. PATENT DOCUMENTS

| | | | | |
|---|---|---|---|---|
| 10,640,233 B2* | 5/2020 | Miller | .................... | B64C 39/024 |
| 10,946,982 B2* | 3/2021 | Carthew | .................... | B64F 1/32 |
| 11,195,422 B2* | 12/2021 | Kimchi | .................... | B64C 39/024 |
| 11,379,784 B1* | 7/2022 | Eastman | ............... | B64C 39/024 |
| 2018/0312276 A1* | 11/2018 | Miller | .................... | B64C 39/024 |
| 2021/0031947 A1* | 2/2021 | Wankewycz | ............. | E04H 6/44 |

FOREIGN PATENT DOCUMENTS

| | | | |
|---|---|---|---|
| JP | 2018-178694 A | | 11/2018 |
| JP | 2019-23020 A | | 2/2019 |
| JP | 2019-27122 A | | 2/2019 |
| KR | 10-2017-0017517 A | | 2/2017 |
| KR | 101961668 B1 | * | 3/2019 |

OTHER PUBLICATIONS

"Start of operation of 'patrol monitoring service' of autonomous flight monitoring robot 'SECOM Drone';" https://www.secom.co.jp/corporate/release/2017/nr_20180301.html Mar. 2018; pp. 1-4.

English language translation of abstract of "Start of operation of 'patrol monitoring service' of autonomous flight monitoring robot SECOM Drone".

\* cited by examiner

[Fig. 1A]
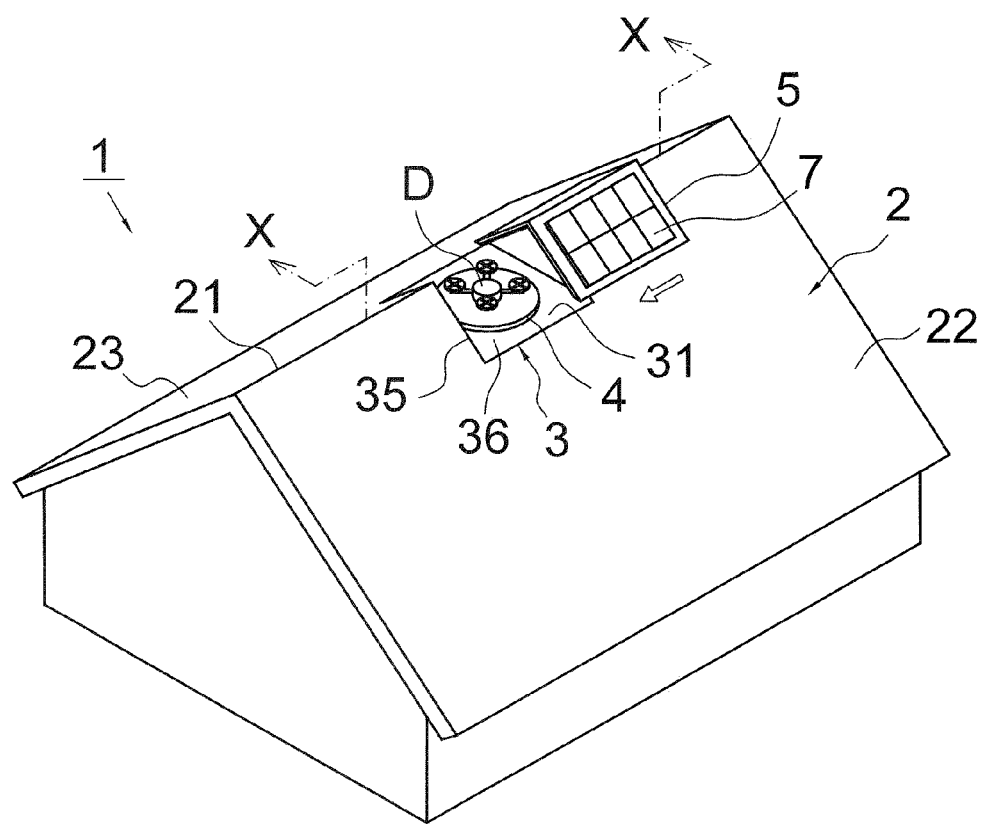

[Fig. 1B]
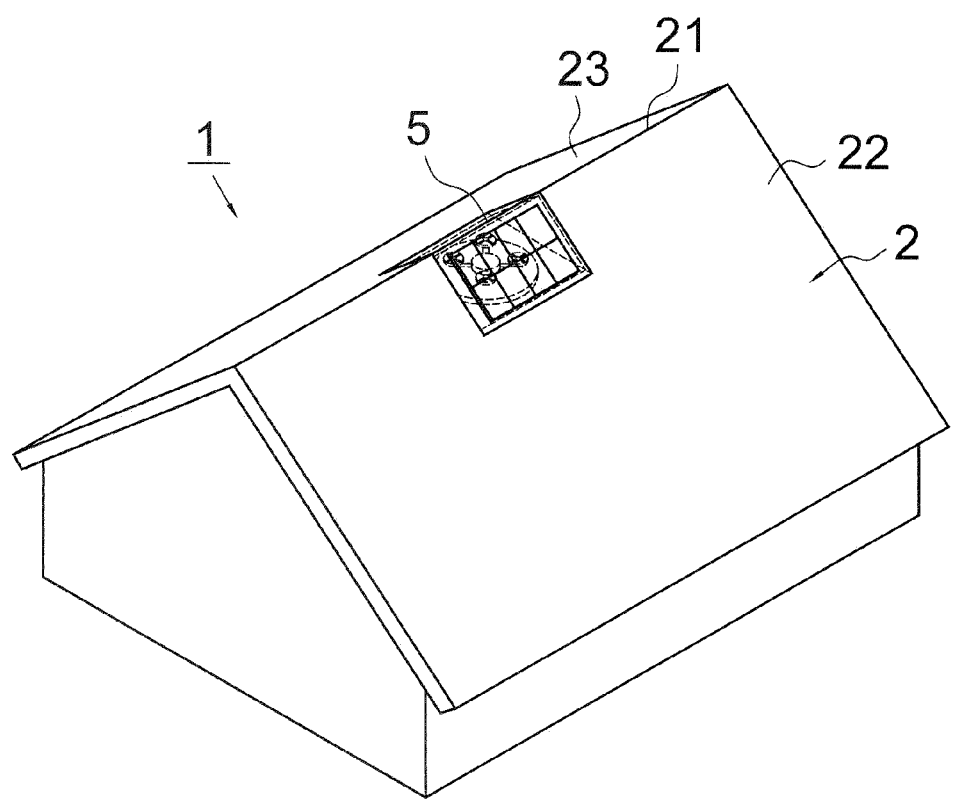

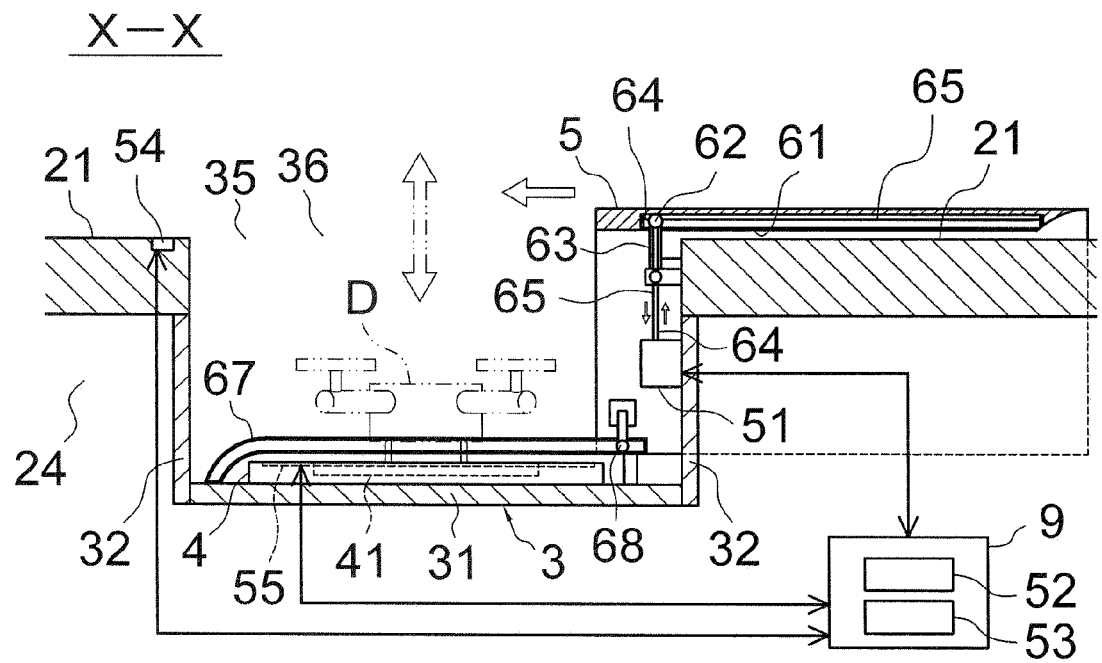
[Fig. 2A]

[Fig. 2B]
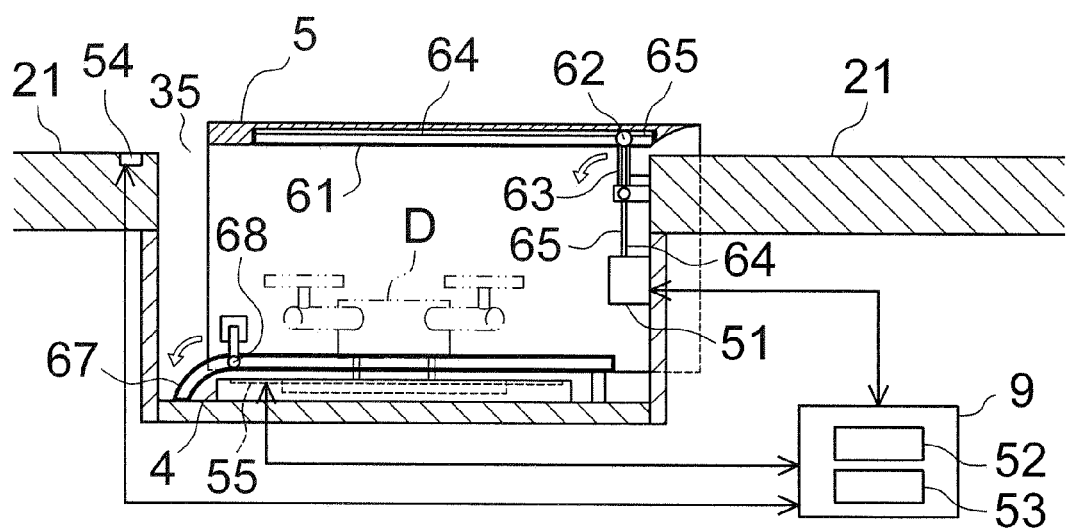

[Fig. 2C]
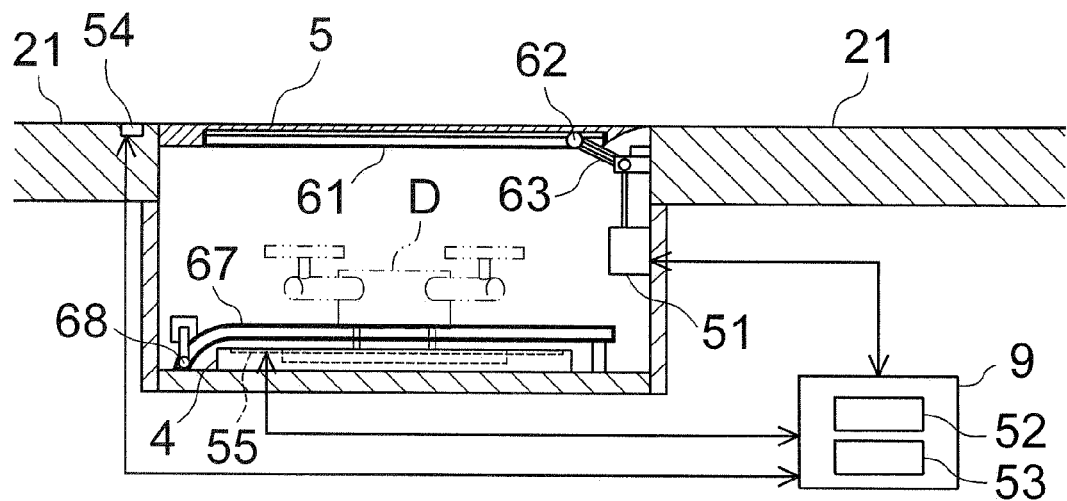

[Fig. 3A]
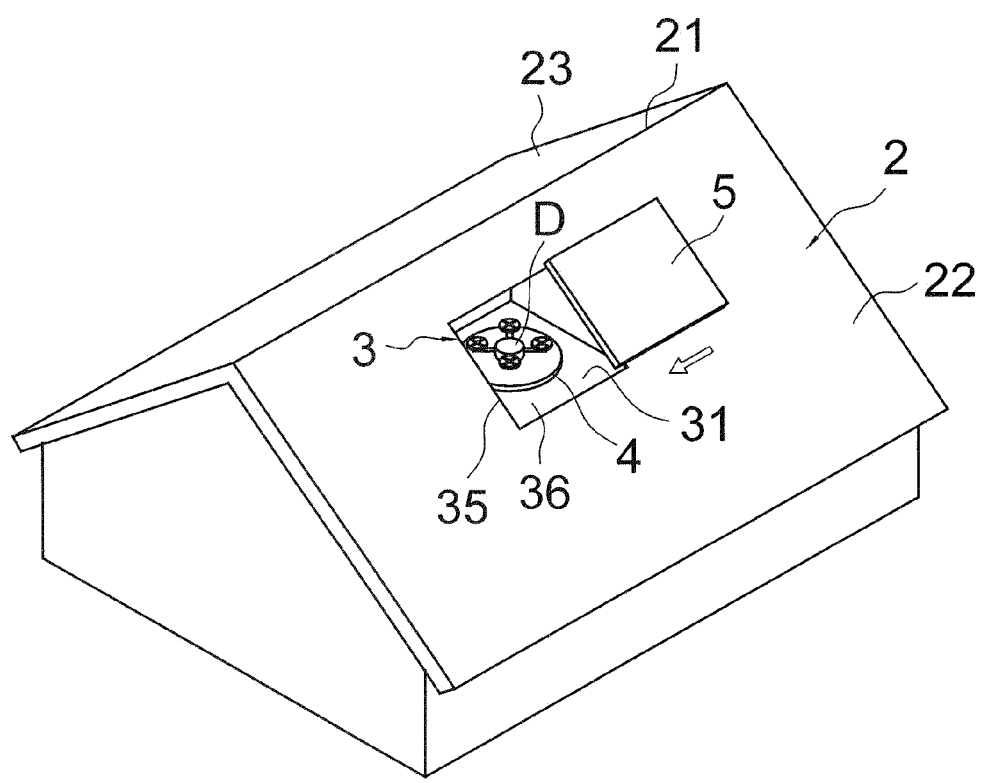

[Fig. 3B]
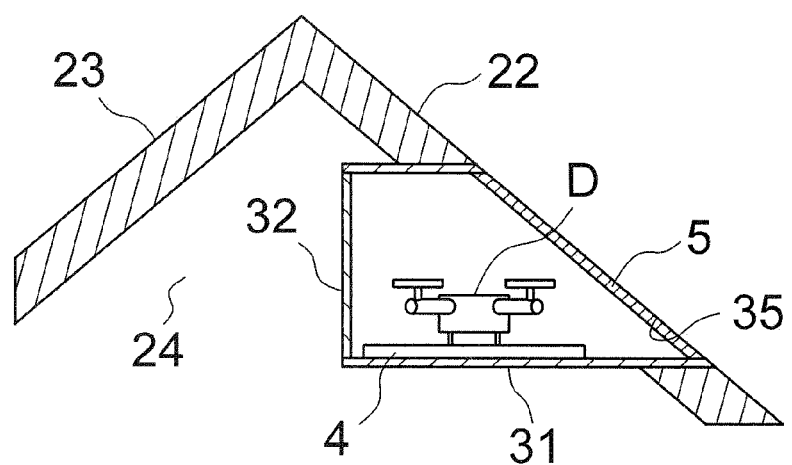

[Fig. 4A]
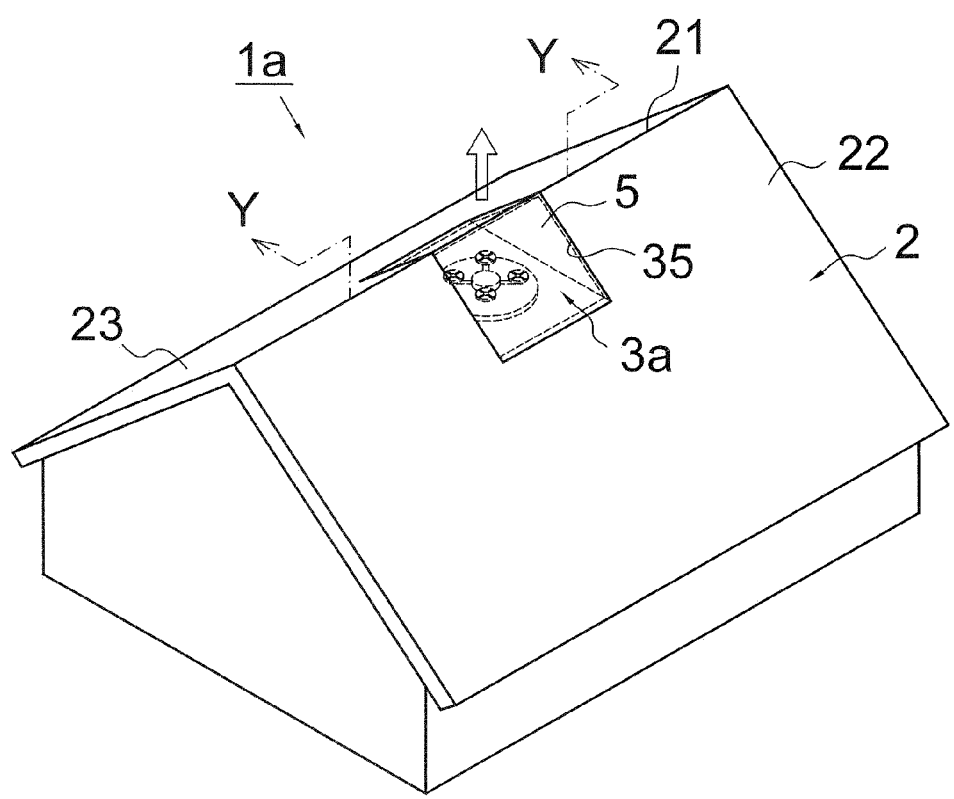

[Fig. 4B]
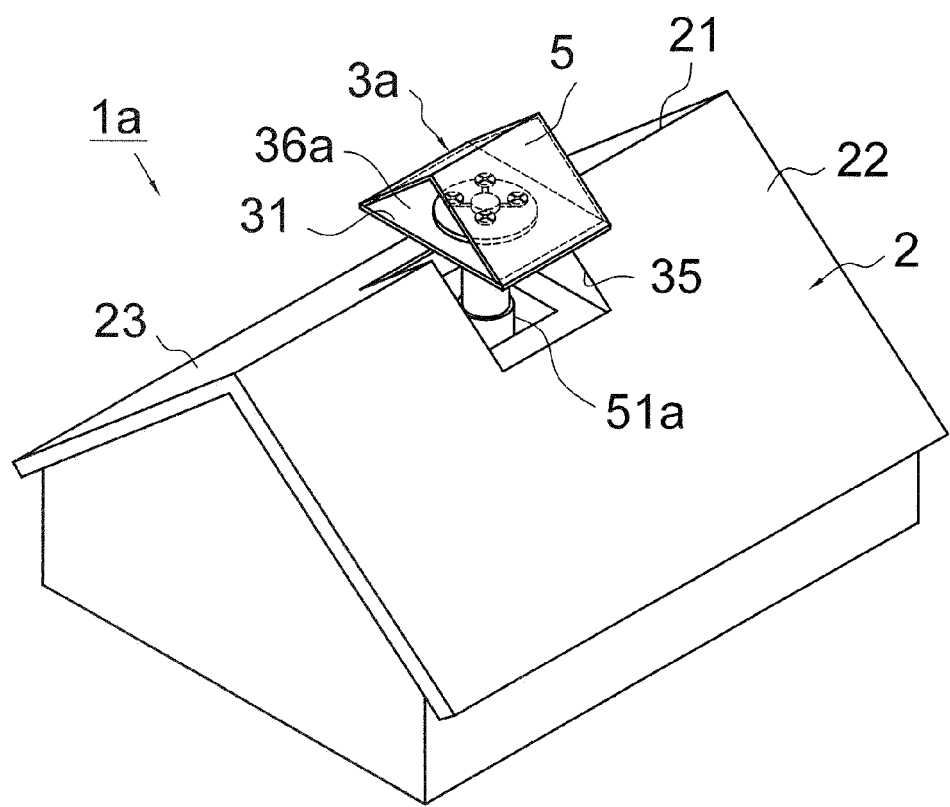

[Fig. 5A]
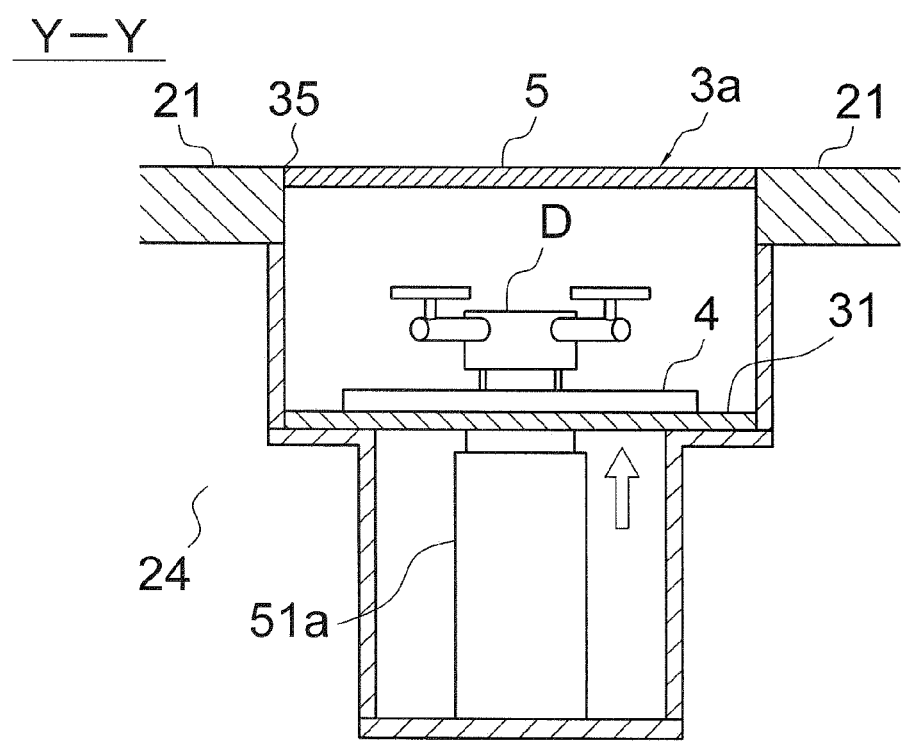

[Fig. 5B]
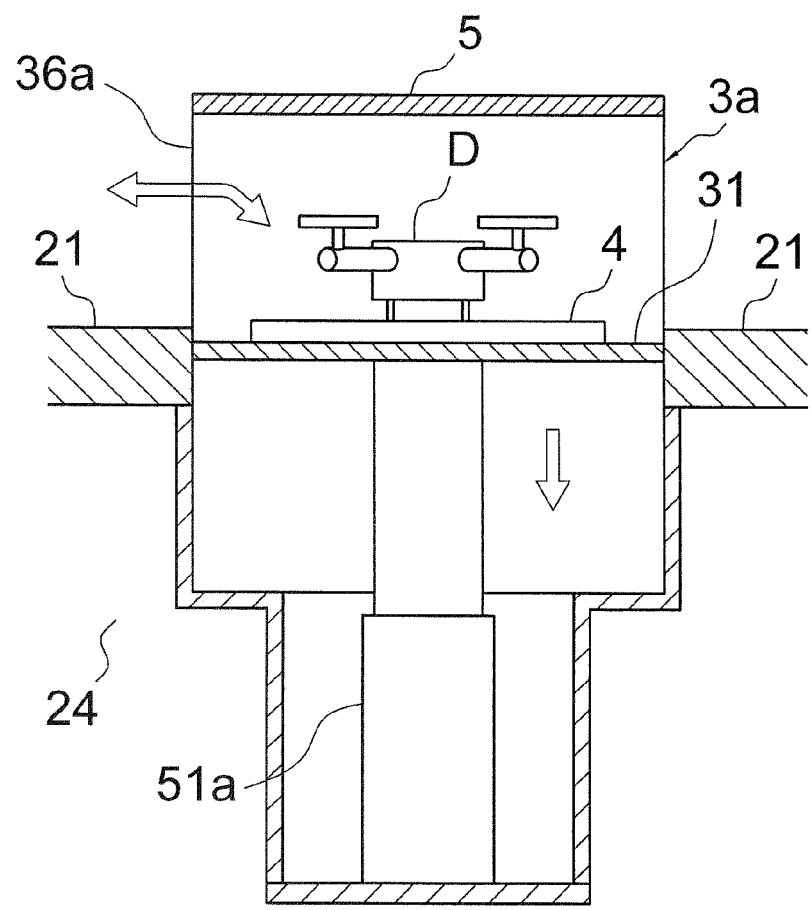

ROOF STRUCTURE

TECHNICAL FIELD

The present invention relates to a roof structure including a drone port on which a drone can take off and land.

BACKGROUND ART

In recent years, small unmanned aerial vehicles (UAVs), called drones, which can be flown by remote control or autopilot and do not carry people, have become popular. Drones are inexpensive and easy to operate. Therefore, operations that cause high costs and dangers such as taking aerial photographs and inspecting high places and dangerous places with a camera mounted on a drone can be performed by drones inexpensively and easily. At present, drones are often manually operated mainly by operators using remote controllers. However, drones can be made to fly autonomously by mounting various sensors such as position sensors, image sensors, and acceleration sensors in addition to cameras. Currently, research and development of various services and systems using such autonomously flyable drones have been promoted.

For example, in the field of logistics industry, the introduction of autonomously flyable drones has been promoted in the home delivery service for delivering packages to general households, and demonstration experiments for practical use have also been started. When home delivery by drones becomes possible, even if the labor and cost required for home delivery are conventionally large, such as delivery to houses in depopulated areas such as remote islands and mountainous areas, delivery to dwelling units on the upper floors of apartment houses, etc., it is expected that home delivery can be performed automatically and easily by using drones and traffic congestion can be alleviated.

In addition, in the field of security industry, the introduction of drones has been promoted in the monitoring service on premises. In the conventional monitoring service, security guards regularly patrol the premises for monitoring, or a monitoring camera is installed on the premises for monitoring. However, patrol monitoring by security guards costs money to secure the number of security guards, and patrols in the middle of the night put a heavy burden on the security guards such that there is a risk of danger to the security guards such as attack by intruders when the security guard is alone. In the case of monitoring with monitoring cameras, the monitoring cameras are fixed at the place where they are installed. Therefore, when monitoring cameras are to be installed so that blind spots do not occur, a large number of monitoring cameras is needed, and it is difficult to secure places for installation of monitoring cameras and the cost for installation work and maintenance will increase. It is expected that such problems will be solved if the drone is equipped with cameras and sensors and the drone can automatically patrol and monitor the premises.

As a monitoring system using a drone, for example, in Patent Literature 1 discloses an automatic drone security system in which a drone dock where a drone can take off and land and can be charged and that also have a function as a housing is installed on premises to be monitored, and the drone is caused to take off and land autonomously with respect to the drone dock and perform autonomous flight of a predetermined flight path, transmits monitoring data acquired by a camera mounted on the drone to a server so that the monitoring data can be checked from a remote terminal or the like. In addition, Non Patent Literature 1 describes that a demonstration experiment of a patrol monitoring service using an autonomous flight monitoring drone was conducted for large facilities such as prisons that perform human patrol security, and the operation of the services was partly started. Non Patent Literature 1 also indicates that a drone dock where a drone can take off and land and can be charged as described in Patent Literature 1 is installed on premises. At present, the demonstration experiments and operations of services for large facilities have partly begun, but in the future, it is expected that it will spread to general housing and services such as automatic monitoring of the premises of the housing by drones will be provided.

In this way, in the fields of home delivery and security, the demonstration experiments and operations of services using drones have partly been conducted, and in the future, also in the services for general households, it is expected that those using drones in various fields in addition to fields of home delivery and security will increase. In order to enjoy such services, it is necessary to provide a house with a drone port where drones can take off and land.

As a drone port provided in a house, for example, Patent Literature 2 describes a drone port can be installed in an outdoor space of a building such as a common corridor in an apartment house, a hospital or other buildings, and enables delivery and reception of packages by a drone. The drone port described in Patent Literature 2 includes a fixing member that can be fixed between the floor and the ceiling outside a building, or a handrail outside the building, and a stage having a flat surface portion for receiving a package from the drone, in which the stage can be moved and returned a predetermined distance in a substantially horizontal direction by rotating and/or sliding with respect to the fixing member while maintaining a horizontal state of the flat surface portion. Further, Patent Literature 3 describes a balcony structure of a building in which a package can be delivered directly to each dwelling unit even in an apartment house when delivering to home using a drone. The balcony structure of the building described in Patent Literature 3 is a balcony structure including adjacent dwelling units and continuous balconies along the dwelling units, and includes a protruding floor portion protruding outward from an outer reference surface of the balcony, and has a drone port formed by the protruding floor portion and a part of the balcony.

CITATION LIST

Patent Literature

Patent Literature 1: JP 2018-516024 A
Patent Literature 2: JP 2019-27122 A
Patent Literature 3: JP 2018-112029 A

Non Patent Literature

Non Patent Literature 1: SECOM Co., Ltd., "Start of operation of 'patrol monitoring service' of autonomous flight monitoring robot 'SECOM Drone'", [online], Press material Mar. 1, 2018, [searched on Sep. 27, 2019], Internet <URL: https://www.secom.co.jp/corporate/release/2017/nr_20180301.html>

SUMMARY OF THE INVENTION

Technical Problems

As mentioned above, it is expected that the use of drones will continue to increase in services provided to general households, and it is necessary to provide a house with a drone port where the drone can take off and land.

At that time, it is conceivable to install a drone dock as described in Patent Literature 1 on the premises of a house. However, a drone dock as described in Patent Literature 1 is installed in a large facility or the like. When it is installed in a general house, for example, it will be installed on a flat lowland part such as a garden where it can be installed stably. However, in the case of such lowland installation, there is a risk that a drone or a drone dock is stolen or damaged by mischief. In addition, there are cases where a house is not provided with a garden large enough to install a drone dock, or the garden itself is not provided. In such cases, a drone dock as described in Patent Literature 1 is difficult to install. In addition, if the drone dock is installed in a place such as a garden where people can enter, there is also a risk that the drone will hit a person and the drone will be damaged or the person will be injured when the drone takes off and lands.

Although Patent Literature 2 and Patent Literature 3 disclose the invention of a drone port provided in a house, both of them are installed in an apartment house, and are installed in an outdoor common corridor or a balcony. Therefore, the drone port described in Patent Literature 2 installed in a common corridor having an outdoor floor and a ceiling cannot be installed when an outdoor common corridor is not provided as in a detached house. Further, in the invention described in Patent Literature 3, it is necessary to provide a protruding floor portion that protrudes further outward from the outer reference surface of the balcony, and it cannot be applied to cases where a space for providing the protruding floor portion on the outside of the balcony cannot be secured. Furthermore, the inventions described in Patent Literature 2 and Patent Literature 3 are both also drone ports for home delivery services using drones, where drones flying from the outside temporarily stop to deliver or receive a package. For example, like security services using drones, it is not expected that the drone is stationed. Therefore, the drone ports described in Patent Literature 2 and Patent Literature 3 do not take into consideration the influence of weather such as wind, rain, and snow. Further, as in the inventions described in Patent Literature 2 and Patent Literature 3, when the drone port is installed in a common corridor or a balcony, because the common corridor is a passage for people to pass through and people may enter the balcony that is used to hang laundry or the like and things such as the outdoor unit of an air conditioner may be placed in the space, the space that can be used as a common corridor or balcony will be smaller due to the installed drone port and there is a risk that when the drone takes off and lands at the drone port, the drone hits the person or laundry or the like to injure the person or the things and the drone may be damaged.

In order to solve the above problems, it is considered to be preferable to provide a drone port on the roof, which is usually provided on every house without entry of people or things placed thereon. However, the roof of a house is often a sloping roof with gradient such as a gable roof, a hipped roof, or a one-sided roof, rather than a horizontal flat roof. Therefore, the drone dock as described in Patent Literature 1 cannot be installed as it is on a sloping roof. Even if it is installed, it is unstable and there is a risk of falling or the like. Further, Patent Literature 2 and Patent Literature 3 do not describe that the drone port is installed on the roof, and even if it is installed on the roof, unlike the common corridor and the balcony, the roof without walls is easily influenced by the weather such as wind, rain, and snow. However, the drone ports described in Patent Literature 2 and Patent Literature 3 are not configured to protect the landed drones from the influences of the weather, and there is a risk that the drone landing at the drone port may fall due to wind or the like.

The present invention has been made in view of the above circumstances, and it is an object of the present invention to provide a roof structure that can provide a drone port where a drone can stably take off and land on a sloping roof and can protect the drone landed at the drone port from the influences of the weather such as wind, rain, and snow.

Solution to Problems

In order to solve the above problems, the roof structure according to the present invention includes a sloping roof covering the upper part of a building, a drone accommodation portion that has a size capable of accommodating a drone and is provided to cut out a part of the sloping roof so that a bottom surface is substantially horizontal, a drone port that is provided on the bottom surface of the drone accommodation portion where the drone can take off and land, a cover that covers an opening formed on the sloping roof for the drone accommodation portion, and a doorway that is provided on the drone accommodation portion and allows the drone to enter and exit, in which the cover is configured to be openable and closable, and the doorway is opened and closed by opening and closing of the cover.

Preferably, the roof structure according to the present invention includes a drive means for driving opening and closing of the cover, an information acquisition means for acquiring takeoff/landing information of the drone, and a control means for controlling the drive means to open and close the cover on the basis of the takeoff/landing information acquired by the information acquisition means.

Preferably, in the roof structure according to the present invention, the drone port includes a contactless charging means that can charge the drone with the drone being landed at the drone port.

Preferably, the roof structure according to the present invention includes a solar cell on an outer surface of the cover, and the contactless charging means charges the drone using power generated by the solar cell.

A second roof structure according to the present invention includes a sloping roof covering the upper part of a building, a drone accommodation portion that has a size capable of accommodating a drone and is provided to cut out a part of the sloping roof so that a bottom surface is substantially horizontal, a drone port that is provided on the bottom surface of the drone accommodation portion where the drone can take off and land, a cover that covers an opening formed on the sloping roof for the drone accommodation portion, and a doorway that is provided on the drone accommodation portion and allows the drone to enter and exit, in which the cover is fixed to the bottom surface of the drone accommodation portion, the bottom surface of the drone accommodation portion is configured to be movable between a state of protruding to the outside of the sloping roof and a state of being fit inside the sloping roof, and the doorway is opened and closed by movement of the bottom surface.

Advantageous Effects of Invention

The roof structure according to the present invention includes a sloping roof covering the upper part of a building, a drone accommodation portion that has a size capable of accommodating a drone and is provided to cut out a part of the sloping roof so that a bottom surface is substantially horizontal, a drone port that is provided on the bottom surface of the drone accommodation portion where the drone can take off and land, a cover that covers an opening formed on the sloping roof for the drone accommodation portion, and a doorway that is provided on the drone accommodation portion and allows the drone to enter and exit, in which the cover is configured to be openable and closable, the doorway is opened and closed by opening and closing of the cover, the drone accommodation portion is provided to cut out a part of the sloping roof, the bottom surface of the drone accommodation portion is substantially horizontal, the drone port is provided on the bottom surface, and therefore the drone port can be provided even on the sloping roof such that the drone can stably take off and land. Further, the cover covering the opening formed on the sloping roof for the drone accommodation portion is provided, the cover is configured to be openable and closable, and opening and closing of the cover opens and closes the doorway that is provided on the drone accommodation portion where the drone can enter and exit. Therefore, by opening the cover to open the doorway of the drone accommodation portion, the drone can take off and land with respect to the drone port provided on the bottom surface of the drone accommodation portion through the doorway. Further, the drone accommodation portion has a size capable of accommodating the drone, and the doorway of the drone accommodation portion can be closed by closing the cover with the drone being landed at the drone port, it is possible to protect the drone from the influence of weather such as wind, rain, and snow.

Preferably, the roof structure according to the present invention includes a drive means for driving opening and closing of the cover, an information acquisition means for acquiring takeoff/landing information of the drone, and a control means for controlling the drive means to open and close the cover on the basis of the takeoff/landing information acquired by the information acquisition means, in which the drive means is controlled to be driven by the control means on the basis of the takeoff/landing information of the drone acquired by the information acquisition means, the cover is closed when the drone is flying outside or the drone is landed at the drone port, and the cover is opened to open the doorway of the drone accommodation portion only when the drone takes off and lands with respect to the drone port. Therefore, when the drone port of the roof structure according to the present invention is used as a base point of departure and arrival of the autonomously flyable drone such that the autonomously flyable drone starts from the drone port of the roof structure according to the present invention, flies, and then returns to the drone port of the roof structure according to the present invention, the cover is automatically opened when the drone takes off and lands with respect to the drone port and the cover is automatically closed at other times without manually operating the cover, and therefore even when the drone performs autonomous flight 24 hours a day, 365 days a year, the drone landed inside the drone accommodation portion or at the drone port can be protected from the influence of weather such as wind, rain, and snow.

Preferably, in the roof structure according to the present invention, the drone port includes a contactless charging means that can charge the drone with the drone being landed at the drone port, and the drone can be charged without connecting a charging cable or the like by only landing the drone at the drone port according to the present invention. Therefore, when the drone port of the roof structure according to the present invention is used as a base point of departure and arrival of the autonomously flyable drone, the drone can be charged automatically without a manual operation for charging when the drone has returned to and landed at the drone port of the roof structure according to the present invention, enabling autonomous flight of the drone 24 hours a day, 365 days a year.

Preferably, the roof structure according to the present invention includes a solar cell on an outer surface of the cover, and the contactless charging means charges the drone using power generated by the solar cell such that the power for charging the drone can be saved.

The second roof structure according to the present invention includes a sloping roof covering the upper part of a building, a drone accommodation portion that has a size capable of accommodating a drone and is provided to cut out a part of the sloping roof so that a bottom surface is substantially horizontal, a drone port that is provided on the bottom surface of the drone accommodation portion where the drone can take off and land, a cover that covers an opening formed on the sloping roof for the drone accommodation portion, and a doorway that is provided on the drone accommodation portion and allows the drone to enter and exit, in which the cover is fixed to the bottom surface of the drone accommodation portion, the bottom surface of the drone accommodation portion is configured to be movable between a state of protruding to the outside of the sloping roof and a state of being fit inside the sloping roof, and the doorway is opened and closed by movement of the bottom surface, the drone accommodation portion is provided to cut out a part of the sloping roof, the bottom surface of the drone accommodation portion is substantially horizontal, the drone port is provided on the bottom surface, and therefore the drone port can be provided even on the sloping roof such that the drone can stably take off and land. Further, the cover covering the opening formed on the sloping roof for the drone accommodation portion is provided, the cover is fixed to the bottom surface of the drone accommodation portion, the bottom surface of the drone accommodation portion is configured to be movable between a state of protruding to the outside of the sloping roof and a state of being fit inside the sloping roof, and the movement of the bottom surface opens and closes the doorway that is provided on the drone accommodation portion where the drone can enter and exit. Therefore, by opening the doorway of the drone accommodation portion by moving the bottom surface to protrude to the outside of the sloping roof, the drone can take off and land with respect to the drone port provided on the bottom surface of the drone accommodation portion through the doorway. Further, the drone accommodation portion has a size capable of accommodating the drone, and the doorway of the drone accommodation portion can be closed by moving the bottom surface to fit inside the sloping roof with the drone being landed at the drone port, it is possible to protect the drone from the influence of weather such as wind, rain, and snow.

BRIEF DESCRIPTION OF THE DRAWINGS

FIG. 1A is a perspective view showing an example of a roof structure according to a first embodiment, showing the state with the cover opened.

FIG. 1B is a view illustrating the state with the cover closed according to FIG. 1A.

FIG. 2A is a part of cross-sectional front view showing the state with the cover open according to FIG. 1A, whose X-X arrow direction.

FIG. 2B is a part of cross-sectional front view according to FIG. 2A, showing the cover is in the middle of opening or closing FIG. 2C is a part of cross-sectional front view according to FIG. 2A, with the cover closed.

FIG. 3A is a perspective view showing a different example from FIG. 1A of a roof structure according to a first embodiment, showing the cover opened.

FIG. 3B is cross-sectional side view according to FIG. 3A roof structure, showing the cover closed.

FIG. 4A is a perspective view showing an example of a roof structure according to a second embodiment, showing the doorway closed.

FIG. 4B is a view showing the doorway opened according to FIG. 4A.

FIG. 5A is a part of cross-sectional front view showing the doorway closed according to the roof structure FIG. 4A, whose Y-Y arrow direction.

FIG. 5B is a part of cross-sectional front view showing the doorway opened, according to FIG. 5A.

DESCRIPTION OF EMBODIMENTS

Embodiments of the roof structure according to the present invention will be described below with reference to the drawings. However, the following is merely an example of one embodiment of the present invention, and the scope of the present invention is not limited to the following embodiments, and can be appropriately changed without departing from the idea of the present invention.

First Embodiment

A roof structure 1 according to the present embodiment, as shown in FIGS. 1A to 2C, includes a sloping roof 2 covering the upper part of a building, a drone accommodation portion 3 that has a size capable of accommodating a drone D and is provided to cut out a part of the sloping roof 2 so that a bottom surface 31 is substantially horizontal, a drone port 4 that is provided on the bottom surface 31 of the drone accommodation portion 3 where the drone D can take off and land, a cover 5 that covers an opening 35 formed on the sloping roof 2 for the drone accommodation portion 3, and a doorway 36 that is provided on the drone accommodation portion 3 and allows the drone D to enter and exit. The cover 5 is configured to be openable and closable, and the doorway 36 is opened and closed by opening and closing of the cover 5.

According to the roof structure 1 according to the present embodiment, the drone accommodation portion 3 is provided to cut out a part of the sloping roof 2 covering the upper part of the building, the bottom surface 31 of the drone accommodation portion 3 is substantially horizontal, and the drone port 4 is provided on the bottom surface 31. Therefore, the drone port 4 can be provided so that the drone D can stably take off and land even in a building having a sloping roof 2 having a slope instead of a horizontal flat roof.

Further, since the drone port 4 is installed on the roof, people do not usually enter or put things near the drone port 4. Therefore, as compared to the case where the drone port is installed in places where people can enter such as lowlands, e.g., gardens, or balconies, it is possible to reduce the risk that when the drone D takes off and lands at the drone port 4, the drone D hits people or things and injure the people or damages the drone D or the things, and it is also possible to reduce the risk that the drone port 4 and drone D get mischievous or are stolen.

Further, the drone accommodation portion 3 has a size capable of accommodating the drone D, the cover 5 covering the opening 35 formed on the sloping roof 2 for the drone accommodation portion 3 is provided to be openable and closable, and the opening and closing of the cover 5 opens and closes the doorway 36 that is provided on the drone accommodation portion 3 where the drone D can enter and exit. Therefore, by closing the cover 5 while the drone D is being landed at the drone port 4 provided on the bottom surface 31 of the drone accommodation portion 3, the doorway 36 of the drone accommodation portion 3 is closed while the drone D is accommodated in the drone accommodation portion 3, enabling protection of the drone D from the influences of weather such as wind, rain, and snow.

Each configuration of the roof structure 1 according to the present embodiment will be further described below. The sloping roof 2 is a sloping roof that covers the upper part of a building. In the present embodiment, as shown in FIGS. 1A and 1B, an example of the case where the sloping roof 2 is a roof of a so-called gable roof having a substantially chevron shape including a ridge 21 having a linear shape extending substantially horizontally and two roof surfaces 22 and 23 sloping diagonally downward from the ridge 21 to both sides from the ridge 21, which is the top, is shown. An attic space 24 is provided between the ceiling of the rooms of the building and the sloping roof 2.

The drone accommodation portion 3 is provided to cut out a part of the sloping roof 2, and the bottom surface 31 of the drone accommodation portion 3 is substantially horizontal. In the present embodiment, the sloping roof 2 is a gable roof, and, as shown in FIG. 1A, the drone accommodation portion 3 is provided to partially cut out a portion of the ridge 21, which extends substantially horizontally, of the sloping roof 2. The bottom surface 31 of the drone accommodation portion 3 is located below the ridge 21 and is formed in a substantially rectangular plane shape. The two sets of opposite sides of the bottom surface 31 having a substantially rectangular shape are provided to be substantially parallel or substantially perpendicular with respect to the longitudinal direction of the ridge 21. The drone accommodation portion 3 is provided so that the sloping roof 2 is cut out substantially vertically downward toward the bottom surface 31 to the size of the bottom surface 31. The opening 35 is an opening having a substantially chevron shape similar to the shape of the sloping roof 2 formed on the planes of the roof surface 22 and the roof surface 23 of the sloping roof 2 by providing the drone accommodation portion 3. The space from the opening 35 to the bottom surface 31 located substantially vertically below the opening 35 is the drone accommodation portion 3. The underside of the sloping roof 2 is the attic space 24, and it is preferable that the bottom surface 31 be provided at a position above the height position of the ceiling of the room under the attic space 24 so that the drone accommodation portion 3 fits within the attic space 24. Sidewalls 32 may be provided on each of the four surfaces extending substantially vertically upward from the four sides of the bottom surface 31 which are the side surfaces of the drone accommodation portion 3 to the opening 35, and the drone accommodation portion 3 and the attic space 24 may be defined by the sidewalls 32. In the present embodiment, as shown in FIGS. 1A and 2A, the bottom surface 31 extends from the roof surface 22 to the roof surface 23 in a direction substantially perpendicular to the longitudinal direction of the ridge 21, the sides of the bottom surface 31 substantially parallel to the longitudinal direction of the opposing ridge 21 match the sides of the opening 35 substantially parallel to the longitudinal direction of the opposing ridge 21, respectively, and are located on the planes of the roof surface 22 and the roof surface 23.

The drone port 4 is provided on the bottom surface 31 of the drone accommodation portion 3. In the present embodiment, as shown in FIGS. 1A and 2A, the drone port 4 is member having a circular flat plate shape having a size that allows the drone D to take off and land at the drone port 4, and is installed on the bottom surface 31. The drone accommodation portion 3 is formed so that the drone D fits inside the drone accommodation portion 3 with the drone D landing at the drone port 4. Since the bottom surface 31 is a substantially horizontal flat surface, the drone port 4 can be stably installed on the bottom surface 31. The drone port 4 may be provided with a contactless charging means 41. The contactless charging means 41 is a means that can performs contactless power transmission to a secondary battery that is provided in the drone D for driving the drone D without connecting an electric wire for power supply and without using a metal contact or a connector, and can charge the drone D while the drone D is landed at the drone port 4.

The contactless power transmission method of the contactless charging means 41 includes various methods including an electromagnetic induction method using an induced electromotive force generated in a coil on the power receiving side due to a magnetic flux generated by a current flowing through the coil on the transmitting side, a magnetic field coupling method using the energy of a magnetic field as a medium for power transmission such as a magnetic field resonance method using the fact that an LC resonance circuit is formed by a coil and a capacitor whose resonance frequencies are matched on the transmitting side and the receiving side and the magnetic field generated by the current flowing through the coil on the transmitting side is transmitted to the coil on the receiving side by resonance, and an electric field coupling method using the energy of the electric current generated when electrodes installed on the transmitting side and the power receiving side are brought close to each other for power transmission as a medium. As the contactless charging means 41 provided in the drone port 4, it is sufficient if a device on the transmitting side corresponding to the contactless power transmission method supported by the drone D is appropriately used. For the power source of the contactless charging means 41, it is sufficient if a power source drawn into the building from an electric power company is used. At this time, when a power outlet is provided in the attic space 24, because the drone accommodation portion 3 is surrounded by the attic space 24, the power cable of the contactless charging means 41 of the drone port 4 can be easily wired through the attic space 24 to the power outlet of the attic space 24 without any special wiring work or the like. By wiring the power cable through the attic space 24 in this way, since the attic space 24 is not a place where people usually enter, it is possible to reduce the risk of a person hits the power cable to damage the power cable or disconnect it from the power outlet. In addition, since it is indoors, it is possible to reduce the risk of deterioration of the coating of the power cable due to sunlight, electric leakage due to getting wet with rain, short circuit of the circuit, and the like.

In the present embodiment, the drone port 4 used has a circular flat plate shape, but those having a rectangular flat plate shape or the like may be used, and the drone port 4 may have any shape as long as the drone D can take off and land. Further, in the present embodiment, the drone port 4 is configured to be installed on the bottom surface 31 as a separate member from the bottom surface 31 of the drone accommodation portion 3, but the drone port 4 and the bottom surface 31 may be configured as an integrated member. In that case, the drone port 4 and the bottom surface 31 can be flush with each other without any step, and there is no concern that the legs of the drone D will slip off from the drone port 4, and the installation work of the drone port 4 on site can be omitted with the building materials integrated, and the management cost can be omitted by a reduction in the number of members. However, even when the drone port 4 and the bottom surface 31 are configured as separate members, they can be easily replaced when the drone port 4 is to be replaced, or the drone port 4 can be provided to be movable with respect to the bottom surface 31. Since there are such advantages, it is sufficient if whether they are separate members or an integrated member is appropriately selected.

The cover 5 covers the opening 35 formed on the sloping roof 2 for the drone accommodation portion 3. In the present embodiment, the opening 35 is an opening having a substantially chevron shape similar to the shape of the sloping roof 2 formed on the planes of the roof surface 22 and the roof surface 23 of the sloping roof 2, and as shown in FIG. 1B, the cover 5 is formed in a substantially chevron shape in line with the shape of the opening 35. The cover 5 is configured to be openable and closable, and the opening and closing of the cover 5 opens and closes the doorway 36 provided on the drone accommodation portion 3 where the drone D can enter and exit. In the present embodiment, the doorway 36 is a part or the whole of the opening 35, and the cover 5 is configured to be able to open and close a part or the whole of the opening 35. When the cover 5 is open, the opening part of the opening 35 is the doorway 36, and when the cover 5 is closed, the opening 35 is closed. It is sufficient if the doorway 36 has a size that allows the drone D to enter and exit the drone accommodation portion 3 through the doorway 36. Therefore, when the opening 35 is larger than the size that the drone D enters and exits, the cover 5 may open only a part of the doorway 36 of the opening 35.

In the present embodiment, as shown in FIGS. 1A and 1B, the cover 5 is provided to be opened and closed such that the cover 5 generally slides the outside of the sloping roof 2 along the longitudinal direction of the ridge 21. When the cover 5 is closed, the cover 5 is fit into the opening 35, and the cover 5 is substantially flush with the roof surface 22 and the roof surface 23 around the opening 35. In this way, the cover 5 is formed in a shape similar to the shape of the sloping roof 2, and when the cover 5 is closed, the cover 5 is substantially flush with the surrounding roof surface 22 and roof surface 23. Therefore, when the cover 5 is closed while the drone D is landed at the drone port 4, the cover 5 is substantially integrated with the sloping roof 2 and does not impair the design of the exterior of the building. Further, even in strong winds such as typhoons, when the cover 5 is closed, the cover 5 becomes substantially flush with the surrounding roof surface 22 and roof surface 23, and extra force is less likely to be applied to the cover 5 and the cover 5 is less likely to be damaged.

Further, a solar cell 7 may be provided on the surface of the cover 5. The solar cell 7 is a device having a flat panel shape that converts sunlight shining on the solar cell 7 into electricity. In the present embodiment, the cover 5 is adapted to open and close by sliding the outside of the sloping roof 2. Therefore, the solar cell 7 does not interfere with the opening and closing of the cover 5, and solar cells 7 of various thicknesses can be used. The solar cell 7 and the contactless charging means 41 of the drone port 4 may be connected by an electric wire, and the electricity generated by the solar cell 7 may be used to charge the drone D by the contactless charging means 41. In this way, the power to charge the drone D can be saved. Further, a storage battery for storing the electricity generated by the solar cell 7 may be provided. In this way, when the drone D does not need to be charged, such as when the drone D is not in the landing state at the drone port 4 or in the fully charged state, the electricity generated by the solar cell 7 can be stored in the storage battery. Therefore, the electric power stored in the storage battery can be used for charging the drone D in cloudy weather or the like, and the electric power can be used without waste.

The roof structure 1 according to the present embodiment includes a drive means 51 for driving the opening and closing of the cover 5, an information acquisition means 52 for acquiring the takeoff/landing information of the drone D, and a control means 53 for controlling the drive means 51 to open and close the cover 5 on the basis of the takeoff/landing information of the drone D acquired by the information acquisition means 52, and the cover 5 is configured to automatically open and close according to the takeoff and landing of the drone D with respect to the drone port 4.

In the present embodiment, as shown in FIGS. 2A to 2C, a first rail 61 is provided on the back side of the top portion of the cover 5 having a substantially chevron shape along the direction in which the top portion extends. A bar 63 having a first carriage 62 that moves in the first rail 61 along the first rail 61 at its tip is attached to an upper part of one of the side surfaces perpendicular to the extension direction of the ridge 21 of the drone accommodation portion 3 so that the bar 63 can rotate in an up-and-down direction about the base end of the bar 63. The bar 63 is rotatable from a substantially vertical state in which the first carriage 62 at the tip is located at the upper part in a direction in which the tip falls inward of the drone accommodation portion 3 about the base end. When the bar 63 is in a substantially vertical state, the first carriage 62 is positioned at a position higher than the ridge 21. The first carriage 62 is movable along the first rail 61 by a first wire 64 and a second wire 65. One end of the first wire 64 is fixed to one end side of the first rail 61, wound around a pulley of the first carriage 62 at an intermediate portion, and the other end is connected to the drive means 51. One end of the second wire 65 is fixed to the other end side of the first rail 61, wound around the pulley of the first carriage 62 at an intermediate portion, and the other end is connected to the drive means 51. The drive means 51 is capable of applying tension to the first wire 64 and the second wire 65 to wind or unwind the first wire 64 and the second wire 65. In the present embodiment, an electric motor is used as the drive means 51. Further, the drive means 51 is also configured to drive the rotation of the bar 63. For example, the rotation of the bar 63 may be configured to be driven by the drive means 51 by a shaft rotated by the drive of the drive means 51, which is an electric motor, a first gear fixed to the tip of the shaft, and a second gear that is attached to the base end of the bar 63 and meshes with the first gear and is rotated by the rotation of the first gear in a direction in which the bar 63 is rotated in an up-and-down direction.

As shown in FIG. 2A, when the bar 63 is rotated by the drive means 51 and the bar 63 is substantially vertical, the first carriage 62 at the tip of the bar 63 is located above the ridge 21 and stands still. At this time, the first carriage 62 is engaged with the first rail 61, and the first rail 61 is provided on the back side of the top portion of the cover 5. Therefore, the cover 5 is also lifted above the sloping roof 2 by the rotation of the bar 63. In this state, when the drive means 51 winds up the first wire 64 and unwinds the second wire 65, since one end of the first wire 64 is fixed to one end side of the first rail 61 via the pulley of the first carriage 62 and one end of the second wire 65 is fixed to the other end side of the first rail via the pulley of the first carriage 62, tension is applied to the first wire 64 and the second wire 65 in a direction in which the distance between the one end side of the first rail 61 and the first carriage 62 is shorter and the distance between the other end side of the first rail 61 and the first carriage 62 is longer. Here, the first carriage 62 is in a stationary state with respect to the drone accommodation portion 3, but the first carriage 62 can move in the first rail 61, and the first rail 61 is provided on the cover 5. Therefore, when the tension applied to the first wire 64 and the second wire 65 causes the first rail 61 side to move from the first carriage 62, which is stationary with respect to the drone accommodation portion 3, as a base point, the cover 5 moves over the sloping roof 2 along the direction in which the ridge 21 extends. When the drive means 51 winds up the first wire 64 and unwinds the second wire 65, the cover 5 moves in a direction of opening the doorway 36 so that the one end side of the first rail 61 approaches the first carriage 62. On the contrary, when the drive means 51 unwinds the first wire 64 and winds the second wire 65, as indicated by the arrow of FIG. 2A, the cover 5 moves in a direction of closing the doorway 36 so that the other end side of the first rail 61 approaches the first carriage 62. A second rail 67 and a second carriage 68 that engages with the second rail 67 and can move in the second rail 67 along the second rail 67 are provided so that the cover 5 does not tilt when the cover 5 is moved as described above. The second carriage 68 is attached to one end side of the first rail 61 below the back side of the two sloping surfaces constituting a substantially chevron shape of the cover 5, and the second rail 67 is attached to an end side of the bottom surface 31 along the extension direction of the ridge 21 in line with the position of the second carriage 68.

In the present embodiment, the bar 63 is moved by the vertical rotation of the bar 63 driven by the drive means 51, from the state where the first carriage 62 at the tip of the bar 63 is in a position higher than the ridge 21 substantially vertically to the state where the bar 63 is rotated downward and the first carriage 62 enters the inside of the drone accommodation portion 3. Therefore, when, as shown in FIG. 2A, the cover 5 is translated horizontally along the extension direction of the ridge 21 in the direction of closing the top of the sloping roof 2, and then, as shown in FIGS. 2B and 2C, the bar 63 is rotated downward, the cover 5 is lowered by the amount that the first carriage 62 is lowered, the cover 5 is closed so that the cover 5 fits into the opening 35 so that the cover 5 and the sloping roof 2 around the opening 35 are substantially flush with each other. In opening the cover 5, the bar 63 is rotated upward to lift the cover 5 above the sloping roof 2, and then the cover 5 is translated horizontally by the first wire 64 and the second wire 65. The second rail 67 is a rail of a path that rises, by the amount of upward rotation of the bar 63, from the bottom surface 31 near the other side surface facing one side surface to which the bar 63 is attached among the side surfaces perpendicular to the extension direction of the ridge 21 of the drone accommodation portion 3, and then extends horizontally toward one side surface to which the bar 63 is attached horizontally to follow the movement of the cover 5.

It is sufficient if the cover 5 is opened and closed by the drive of the drive means 51, and as an opening/closing mechanism of the cover 5, a sliding door opening/closing mechanism used for the rear door of a car, a plug door opening/closing mechanism used in a train, a bus, or the like may be used. Further, instead of an opening/closing mechanism that opens and closes the cover 5 so as to slide the outside of the sloping roof 2, an opening/closing mechanism such as a sliding door in which a door pocket that allows the cover 5 to enter inside is provided inside the roof surface 22 and the roof surface 23 of the sloping roof 2 next to the drone accommodation portion 3 where the cover 5 enters and exits the door pocket to open and close the cover 5 may be used, or a butterfly open opening/closing mechanism in which a shaft is passed through the top portion of the cover 5 and this shaft is used as a fulcrum to open and close the cover 5 by rotating one or both of the two sloping surfaces, or vice versa, a shaft is passed through the lower end side of the two sloping surfaces of the cover 5 and this shaft is used as a fulcrum to open the cover 5 from the top portion of the cover 5 may be used.

The information acquisition means 52 and the control means 53 are configured as functions of a computer 9 including a CPU, a memory, an input/output device, and a bus that connects them to each other so that signals can be transmitted and received. The computer 9 performs various information processing and control when the CPU executes various programs stored in a storage device connected to the memory or the input/output device. The computer 9 can transmit and receive signals with respect to various devices when the devices are connected to the input/output device, such as a storage device, e.g., a hard disk, that can store various programs and data, an input device such as a keyboard and a mouse for a person to input information to the computer 9, an output device such as a display for outputting information of the computer 9, a communication device for communicating with other computers such as wired LAN and wireless LAN. The computer 9 can control the various devices connected to the input/output device on the basis of the various programs. Here, the devices connected to the input/output device of the computer 9 may be secondarily connected to the computer 9 wirelessly via a communication device that is connected to the input/output device and can communicate wirelessly. It is sufficient if the devices are connected to the computer 9 so as to be able to transmit and receive signals. The computer 9 includes programs for executing the functions of the information acquisition means 52 and the control means 53, and by executing these programs, the computer 9 functions as the information acquisition means 52 and the control means 53.

The information acquisition means 52 acquires the takeoff/landing information of the drone D. The takeoff/landing information of the drone D acquired by the information acquisition means 52 is the information used by the control means 53 to open and close the cover 5. When the drone D takes off and lands with respect to the drone port 4, the cover 5 needs to be open to open the doorway 36 of the drone accommodation portion 3. When the drone D is landed at the drone port 4 or the drone D is not inside the drone accommodation portion 3, it is preferable that the cover 5 be closed to protect the inside of the drone accommodation portion 3 from the influences of weather such as wind, rain, and snow, and it is preferable that the control means 53 control the opening and closing of the cover 5 so that the cover 5 is opened only when the drone D takes off and lands with respect to the drone port 4 but is closed at other times. Therefore, in the present embodiment, the takeoff/landing information of the drone D acquired by the information acquisition means 52 includes landing opening information for opening the cover 5 when the drone D flying outside the drone accommodation portion 3 starts the landing operation to the drone port 4, landing closing information for closing the cover 5 when the landing of the drone D to the drone port 4 in the drone accommodation portion 3 is completed, takeoff opening information for opening the cover 5 when the drone D starts the takeoff operation from the drone port 4 in the drone accommodation portion 3, and takeoff closing information for closing the cover 5 when the drone D goes out from the drone accommodation portion 3 and the takeoff is completed. Further, the takeoff/landing information of the drone D may further include identification information for identifying the drone D. When the information acquisition means 52 acquires the identification information and the control means 53 controls the opening and closing of the cover 5 after the drone D is identified by the identification information, the cover 5 will not be opened and closed when another unintended drone different from the drone D approaches.

In the present embodiment, as shown in FIGS. 2A to 2C, an approach/separation sensor 54 that detects the approach and separation of the drone D to the cover 5 is provided and a contact sensor 55 that detects the contact of the drone D with the drone port 4 is provided at the drone port 4. The approach/separation sensor 54 and the contact sensor 55 are connected to the input/output device of the computer 9, and the information acquisition means 52 acquires detection signals from the approach/separation sensor 54 and the contact sensor 55 input to the computer 9 as the takeoff/landing information of the drone D. The approach/separation sensor 54 is a sensor for detecting the approach and separation of the drone D. For example, a Doppler sensor using a microwave transmission signal transmitted from the sensor and a reflection signal reflected by a reflecting object, or the like can be used. The approach/separation sensor 54 is attached to the cover 5 or the sloping roof 2 near the cover 5 so that the drone D can detect the approach and separation with respect to the cover 5. The contact sensor 55 is a sensor for detecting whether the drone D is in contact with the drone port 4 and is in a landing state, or the drone D is not in contact with the drone port 4 and the drone D is in a flying state.

The control means 53 controls the drive means 51 to open and close the cover 5 on the basis of the takeoff/landing information of the drone D acquired by the information acquisition means 52. The drive means 51 is connected to the input/output device of the computer 9, and the control means 53, when the takeoff/landing information of the drone D is input from the information acquisition means 52, generates a control signal for controlling the drive means 51 on the basis of the takeoff/landing information and outputs the control signal to the drive means 51. The drive means 51 is driven by the control signal from the control means 53 to open and close the cover 5.

When the drone D lands at the drone port 4, when the drone D flying outside the drone accommodation portion 3 approaches the closed cover 5, the approach/separation sensor 54 inputs a detection signal indicating that the drone D is approaching, to the computer 9. When the information acquisition means 52 receives the detection signal of the approach of the drone D by the approach/separation sensor 54, the information acquisition means 52 outputs the landing opening information for opening the cover 5 to the control means 53 as the takeoff/landing information. When the control means 53 receives the landing opening information from the information acquisition means 52, the control means 53 controls the drive means 51 to open the cover 5 to open the doorway 36 of the drone D. When the drone D enters the drone accommodation portion 3 through the doorway 36 and lands at the drone port 4, the contact sensor 55 provided at the drone port 4 inputs the detection signal indicating that the drone D is in contact with the drone port 4, to the computer 9. When the information acquisition means 52 receives the detection signal of the contact of the drone D with the drone port 4 by the contact sensor 55, the information acquisition means 52 outputs the landing closing information for closing the cover 5 to the control means 53 as the takeoff/landing information. When the control means 53 receives the landing closing information from the information acquisition means 52, the control means 53 drives the drive means 51 to close the cover 5.

When the drone D takes off from the drone port 4, the contact sensor 55 inputs a detection signal indicating that the drone D is no longer in contact with the drone port 4 or the contact shape body has changed, to the computer 9. When the information acquisition means 52 receives the detection signal indicating that the drone D is no longer in contact with the drone port 4 or the contact shape body has changed from the contact sensor 55, the information acquisition means 52 outputs the takeoff opening information for opening the cover 5 to the control means 53 as the takeoff/landing information. When the control means 53 receives the takeoff opening information from the information acquisition means 52, the control means 53 drives the drive means 51 to open the cover 5. When the cover 5 is opened and the drone D jumps out of the drone accommodation portion 3 through the doorway 36, the approach/separation sensor 54 inputs a detection signal indicating that the drone D is moving away from the cover 5, to the computer 9. When the information acquisition means 52 receives the detection signal of the separation of the drone D by the approach/separation sensor 54, the information acquisition means 52 outputs the takeoff closing information for closing the cover 5 to the control means 53 as the takeoff/landing information. When the control means 53 receives the takeoff closing information from the information acquisition means 52, the control means 53 drives the drive means 51 to close the cover 5.

In the present embodiment, the approach/separation sensor 54 and the contact sensor 55 are provided, and the information acquisition means 52 acquires the takeoff/landing information of the drone D on the basis of the detection signals from the approach/separation sensor 54 and the contact sensor 55. However, for example, when the drone D is stationed at the drone port 4, starts from the drone port 4 at a fixed time, flies for a fixed time, and then returns to the drone port 4 at a fixed time, the contact/separation sensor 54 or the contact sensor 55 may not be used, but a clocking means having a timer function may be provided such that a clocking signal from the clocking means according to the time when the drone D takes off and lands with respect to the drone port 4 is used as the takeoff/landing information of the drone D acquired by the information acquisition means 52. Further, when a computer that controls the flight of the drone D and the takeoff and landing with respect to the drone port 4 is provided, the computer and the computer 9 may be connected to each other so as to be communicable, for example, via the Internet, and a command signal when the drone D takes off and lands with respect to the drone port 4 transmitted from the computer that controls the drone D to the drone D may be acquired by the information acquisition means 52 and used for opening and closing the cover 5 as the takeoff/landing information of the drone D. In addition, when a sensor that detects wind, rain, snow, etc. is installed on the cover 5 or near the cover 5, and wind speed, rain, snow, etc. above a certain level that influences the flight of the drone D is detected, the detection signal of the sensor that detects wind, rain, snow, etc. may be used as takeoff/landing information by the information acquisition means 52 to open and close the cover 5, and this takeoff/landing information may be transmitted to the computer that controls the drone D and the computer may transmit a command to the drone D to land at the drone port 4. In addition, instead of providing a sensor that detects wind, rain, snow, etc., the computer 9 may be connected to the Internet and acquire weather forecast information from the Internet and use the weather forecast information as the takeoff/landing information of the drone D of the information acquisition means 52, and further, takeoff/landing information may be transmitted to the computer that controls the drone D so that the drone D takes off and lands with respect to the drone port 4.

As described above, in the present embodiment, the cover 5 is configured to open and close automatically, when the drone D takes off and lands with respect to the drone port 4, the cover 5 is opened and when the drone D lands at the drone port 4 and the drone D is not in the drone accommodation portion 3, the cover 5 is closed. Therefore, it is possible to protect the inside of the drone accommodation portion 3 including the drone D landing at the drone port 4 from the influence of the weather such as wind, rain and snow. Further, as described above, the drone port 4 can be provided with the contactless charging means 41 capable of charging the drone D when the drone D is landed, and in that case, while the drone D is being charged by the contactless charging means 41, the cover 5 is closed with the drone D being landed at the drone port 4. Therefore, the drone D can be charged stably without being influenced by the outside weather. Therefore, the roof structure 1 according to the present embodiment is preferably used as a drone port where the drone D that automatically operates by autonomous flight is stationed that is used in a system that automatically patrols and monitors the surroundings of the building having the roof structure 1 by the drone D or and a system that automatically and periodically inspects the building having the roof structure 1 by the drone D. When the autonomously flyable drone D is started from the drone port 4 of the roof structure 1 according to the present embodiment and performs patrol monitoring by autonomous flight, and is then returned to the drone port 4, since the drone port 4 is provided on the sloping roof 2, people do not normally enter or things are not placed, there is no risk that the drone D hits people and things when the drone D takes off and lands with respect to the drone port 4 and the drone D can safely take off and land with respect to the drone port 4. Further, the cover 5 opens and closes automatically, and the drone D can be automatically charged by the contactless charging means 41 merely by landing the drone D at the drone port 4, operations by a person such as an operation of opening and closing the cover 5 and an operation of charging the drone D are not necessary, enabling autonomous flight of the drone D 24 hours a day, 365 days a year. Further, with the roof structure 1 according to the present embodiment, when the cover 5 is closed, the cover 5 is substantially flush with the roof surface 22 and the roof surface 23 and is substantially integrated with the sloping roof 2. Therefore, the drone port 4 can be provided on the sloping roof 2 without significantly impairing the design of the exterior of the sloping roof 2, and it is possible to reduce the risk that the cover 5 is subject to a large force and damaged because the wind hitting the cover 5 is swept to the surrounding sloping roof 2 even in the case of strong winds such as typhoons.

Further, the drone port 4 may be provided with a locking means for locking the drone D and fixing it to the drone port 4 when the drone D lands. The locking means can be switched between a locked state in which the drone D is fixed to the drone port 4 and an unlocked state in which the drone D is released from the fixation to the drone port 4, and is configured to automatically control switching between the locked state and the unlocked state depending on the takeoff and landing of the drone D with respect to the drone port 4. By providing such a locking means for the drone D, it is possible to reduce the risk that the drone D will move and be damaged even when vibration is applied to the roof structure 1 due to an earthquake or the like. As the locking means, for example, when the drone D is provided with legs so that the legs touch the ground at the time of landing, it is sufficient if the legs are fixed. When the legs of the drone D are, for example, legs including four vertical portions extending downward from the body of the drone D and two horizontal portions each extending between the lower ends of the two vertical portions, as the locking means, a hook-shaped member that can be engaged with each horizontal portion is provided at the drone port 4 so as to be rotatable on a vertical surface with respect to the horizontal portion, so that the locked state in which the hook-shaped member is engaged with the horizontal portion and the unlocked state in which the hook-shaped member is released from the engagement can be switched by rotation of the hook-shaped member. Further, for example, when the legs of the drone D are legs including a plurality of vertical portions extending downward from the body of the drone D and flange portions provided at the lower end of each vertical portion and larger than the thickness diameter of each vertical portion, as the locking means, a plate member having a groove portion that is cut out to a diameter larger than the diameter of the vertical portion and smaller than the size of the flange portion and can be engaged with the vertical portion is provided at the drone port 4 so as to be rotatable on the horizontal plane, such that the locked state in which the plate member is engaged with the vertical portion and the unlocked state in which the plate member is released from the engagement can be switched by rotation of the plate member. In this way, it is sufficient if the locking means is appropriately configured according to the shape of the drone D or the like, and, for example, the body of the drone D may be locked instead of the legs of the drone D, or any means can be adopted as long as the drone D can be fixed to the drone port 4 into a locked state and the locked state and the unlocked state can be switched. Further, for automatic switching control between the locked state and the unlocked state of the locking means, it is sufficient if a drive means for driving the switching of the locking means is provided and the drive means for switching of the locking means is controlled such that, for example, a detection signal of the contact sensor 55 that detects the contact state of the drone D with respect to the drone port 4 is used, when the drone D comes into contact with the drone port 4, the locking means is switched to the locked state, the locked state is maintained during the contact, and when the contact of the drone D with the drone port 4 disappears, the locking means is switched to the unlocked state and the unlocked state is maintained under the absence of the contact.

In the present embodiment, the drone accommodation portion 3 is provided so as to partially cut out a portion of the ridge 21, which extends substantially horizontally, of the sloping roof 2, and the roof surface 22 and the roof surface 23 are provided so as to be cut out. However, the drone accommodation portion 3 may be provided so as to cut out one of the roof surface 22 and the roof surface 23. For example, FIGS. 3A and 3B show a state in which the opening 35 is formed only on the roof surface 22 and the drone accommodation portion 3 is provided. In this case, it is sufficient if the cover 5 covering the opening 35 has a substantially rectangular flat plate shape so as to be substantially flush with the roof surface 22 when the cover 5 is closed. The drone accommodation portion 3 may be provided so as to cut out the sloping roof 2 downward from the opening 35 and the bottom surface 31 may be provided below at a distance from the opening 35, and further, as shown in FIGS. 3A and 3B, the drone accommodation portion 3 may be provided so as to laterally cut out the sloping roof 2 from the opening 35. In this case, as shown in FIG. 3B, a substantially horizontal bottom surface 31 extends from the lower end side of the opening 35 toward the inside of the sloping roof 2, and it is sufficient if the extension length of the bottom surface 31 is large enough to provide the drone port 4 and the cover 5 can be closed with the drone D landing at the drone port 4. It is sufficient if the way of providing the drone accommodation portion 3 inside from the opening 35 is appropriately determined according to the gradient of the roof surface 22. The roof structure 1 can be applied even in the case where the sloping roof 2 is a one-sided roof including a roof surface having one gradient.

Further, as shown in FIGS. 3A and 3B, when the drone accommodation portion 3 is provided so as to cut out the sloping roof 2 laterally from the opening 35 and the opening 35, i.e., the doorway 36 is not located vertically above the drone port 4 provided on the bottom surface 31 of the drone accommodation portion 3, the drone D will enter and exit in a diagonal direction, not a vertically up-and-down direction, with respect to the doorway 36 when taking off and landing with respect to the drone port 4. However, the drone port 4 may be provided so as to be movable so that the drone D can take off and land with respect to the drone port 4 vertically up and down. For example, in the drone accommodation portion 3 of FIGS. 3A and 3B, one side of the upper surface of the bottom surface 31 is provided on the sloping surface 22 to match the lower side of the opening 35. Therefore, it is sufficient to have a configuration in which the drone port 4 is provided to be movable in the horizontal direction, after the cover 5 is opened, the drone port 4 protrudes outward so as to move to a position where the sloping roof 22 or the like does not hang over vertically above the range required for takeoff and landing of the drone D of the drone port 4, and then, the drone D takes off and lands, and after the takeoff and landing is completed, the drone port 4 is moved inward so as to be housed inside the drone accommodation portion 3, and the cover 5 is closed. It is sufficient if the moving mechanism of the drone port 4 is configured by using a rack and pinion, a linear motion cylinder, or the like so that, for example, the drone port 4 moves along a rail by providing the rail on the bottom surface 31.

Second Embodiment

Next, a roof structure 1a according to the second embodiment will be described with reference to FIGS. 4A to 5B. As shown in FIGS. 4A to 5B, the roof structure 1a according to the present embodiment shows an example in the case of the same sloping roof 2 as the roof structure 1 shown in FIGS. 1A to 2C, and the same parts are indicated by the same reference numerals. In the roof structure 1 shown in FIGS. 1A to 2C, the cover 5 covering the opening 35 provided on the sloping roof 2 is configured to be openable and closable and the opening and closing of the cover 5 opens and closes the doorway 36, where the drone D can enter and exit, which is a part or the whole of the opening 35. However, in the roof structure 1a according to the present embodiment, the cover 5 covering the opening 35 provided on the sloping roof 2 is not configured to be openable and closable, but fixed to the bottom surface 31. Then, instead of the drive means 51 provided for driving the opening and closing of the cover 5 in the roof structure 1, in the roof structure 1a, a drive means 51a for moving the bottom surface 31 in the up-and-down direction is provided below the bottom surface 31. For the drive means 51a, for example, an electric cylinder, a hydraulic cylinder, an electric jack, or the like can be used. As shown in FIGS. 4B and 5B, by moving the bottom surface 31 upward by the drive means 51a, the bottom surface 31 and the cover 5 fixed to the bottom surface 31 are integrally moved upward. The cover 5 has a substantially chevron shape that matches the shape of the opening 35, and the lower sides of the two sloping surfaces of the cover 5 are fixed to the sides of the sloping surface 22 and sloping surface 23 of the bottom surface 31 having a substantially rectangular shape. Therefore, the ends of the drone accommodation portion 3a formed by the bottom surface 31 and the cover 5 in the direction in which the ridge 21 extends are a substantially triangular opening by the two sloping surfaces of the cover 5 and the bottom surface 31, and this opening is a doorway 36a where the drone D enters and exits. As described above, in the drone accommodation portion 3a of the roof structure 1a, the doorway 36a is formed at a place different from the opening 35, and when the drone accommodation portion 3a is fit inside the sloping roof 2 so as to be substantially integrated with the sloping roof 2, the doorway 36a is blocked in a closed state. From there, when the drone accommodation portion 3a is moved so as to protrude to the outside of the sloping roof 2 by the drive means 51a, the doorway 36a is exposed into an opened state, and the drone D can take off and land with respect to the drone port 4 of the drone accommodation portion 3a through the doorway 36a.

In the roof structure 1a according to the present embodiment, the doorway 36a is configured to be opened and closed by moving the bottom surface 31 in the up-and-down direction by the drive means 51a. However, for example, as shown in FIG. 3B, when the drone accommodation portion 3a is provided to laterally cut out the roof surface 22 of the sloping roof 2, the bottom surface 31 extends from the lower side of the opening 35 of the roof surface 22 to the inside of the sloping roof 2, and the cover 5 covering the opening 35 is fixed to the bottom surface 31, the drone accommodation portion 3a having the bottom surface 31 and the cover 5 may be moved horizontally by the drive means 51a so that the drone accommodation portion 3a protrudes from the roof surface 22 to open the doorway 36a. It is sufficient if whether the direction in which the drone accommodation portion 3a is moved by the drive means 51a is the up-and-down direction or the horizontal direction is properly determined depending on the gradient of the roof surface 22 so that the amount of movement of the drone accommodation portion 3a due to the opening and closing of the doorway 36a is reduced. Further, the moving direction of the drone accommodation portion 3a is not limited to the up-and-down direction and the horizontal direction, but may be, for example, a diagonal direction, and any direction may be adopted as long as the doorway 36a through which the drone D can enter and exit the drone accommodation portion 3a can be opened and closed.

REFERENCE SIGNS LIST 1,1a: Roof structure
2: Sloping roof
3,3a: Drone accommodation portion
31: Bottom surface
35: Opening
36,36a: Doorway
4: Drone port
41: Contactless charging means
5: Cover
51,51a: Drive means
52: Information acquisition means
53: Control means
7: Solar cell
D: Drone

The invention claimed is:

1. A roof structure comprising:
a sloping roof covering the upper part of a building;
a drone accommodation portion that has a size capable of accommodating a drone and is provided to cut out a part of the sloping roof so that a bottom surface is substantially horizontal;
a drone port that is provided on the bottom surface of the drone accommodation portion where the drone can take off and land;
a cover that covers an opening formed on the sloping roof for the drone accommodation portion; and
a doorway that is provided on the drone accommodation portion and allows the drone to enter and exit,
wherein the cover is fixed to the bottom surface of the drone accommodation portion, and
wherein the bottom surface of the drone accommodation portion is configured to be movable between a state of protruding to the outside of the sloping roof and a state of being fit inside the sloping roof, and the doorway is opened and closed by movement of the bottom surface.

2. The roof structure according to claim 1,
wherein a solar cell is provided on an outer surface of the cover, and
wherein the contactless charging means charges the drone using power generated by the solar cell.

* * * * *